United States Patent [19]

Slater

[11] 3,852,195
[45] Dec. 3, 1974

[54] LAYERING CONE

[76] Inventor: Grant G. Slater, 986 Somera Rd., Los Angeles, Calif. 90024

[22] Filed: July 17, 1972

[21] Appl. No.: 272,481

[52] U.S. Cl.................... 210/94, 210/232, 210/513
[51] Int. Cl............................................ B01d 17/00
[58] Field of Search ......... 210/20, 83, 84, 232, 513, 210/519, 520, 521, 522, 537, 540, 94

[56] References Cited
UNITED STATES PATENTS

| | | | |
|---|---|---|---|
| 1,671,864 | 5/1928 | Higgins | 210/20 |
| 1,733,324 | 10/1929 | Wetherbee | 210/537 X |
| 3,469,702 | 9/1969 | Perren | 210/540 X |
| 3,623,606 | 11/1971 | Turnidge | 210/519 X |
| 3,666,112 | 5/1972 | Pielkenrood et al | 210/521 |

*Primary Examiner*—Samih N. Zaharna
*Assistant Examiner*—Robert H. Spitzer
*Attorney, Agent, or Firm*—Wills, Green & Mueth

[57] ABSTRACT

A layering cone device adapted to rapidly layer heavier liquids horizontally below lighter ones which comprises:
 a. a constricted inlet passage which communicates at an angle with,
 b. a constricted riser adapted to control turbulent flow,
 c. communicating with and above said riser an expansion area characterized by interior surfaces which are of a concave curvature,
 d. above said expansion area an enlarged zone characterized by interior planar surfaces,
 e. above said enlarged zone, a zone having essentially vertical inside surfaces and having a cross-sectional area at least as large as said enlarged zone.

6 Claims, 5 Drawing Figures

LAYERING CONE

BACKGROUND OF THE INVENTION

Various devices have been proposed for the layering and ultimate separation of liquids of different densities.

It has been found that when a liquid is continuously injected into another liquid of nearly the same specific gravity from the bottom of a funnel-shaped chamber, the injected liquid may move faster along the sides forming concave layers, bulge up in the middle forming convex layers, or mix depending on the shape of the chamber and the rate of injection.

The device of this invention is used to rapidly layer heavier liquids horizontally below lighter ones. It will layer similar liquids with only slight differences in density in either continuous or discontinuous density gradients.

The device of this invention uses rapid turbulent flow which quickly spreads out the incoming liquid, dissipates its energy, and slows down its upward movement. The funnel of my invention is constricted at the bottom to control the turbulent flow and prevent circular mixing. The constricted area opens into an enlarged area, called the expansion area, a sharp curve is used at this transition point so that liquid creeping up the sides is prevented and the incoming liquid spreads below the liquid already in the cone with a minimum of mixing.

The device of this invention may be expected to be quickly and widely adopted in the art of liquid gradient formation.

SUMMARY OF THE INVENTION

Briefly, the invention comprises a layering cone device adapted to rapidly layer heavier liquids horizontally below lighter ones which comprises:

a. constricted inlet passage which communicates at an angle with, b. a constricted riser adapted to control turbulent flow, c. communicating with and above said riser an expansion area characterized by interior surfaces which are of a concave curvature, d. above said expansion area an enlarged zone characterized by interior planar surfaces, e. above said enlarged zone, a zone having essentially vertical inside surfaces and having a cross-sectional area at least as large as said enlarged zone.

It is an object of my invention to provide a novel device adapted to rapidly layer heavier liquids horizontally below lighter ones.

It is also an object of this invention to provide a layering device of novel configuration which is capable of continuous separation of liquids having slight differences in density.

It is also an object of this invention to provide a layering device which may be of one piece in construction or of various pieces which can be separated for easy cleaning.

These and other objects and advantages of this invention will be apparent from the detailed description which follows taken together with the accompanying drawing.

DESCRIPTION OF PREFERRED EMBODIMENTS

Figure 3:
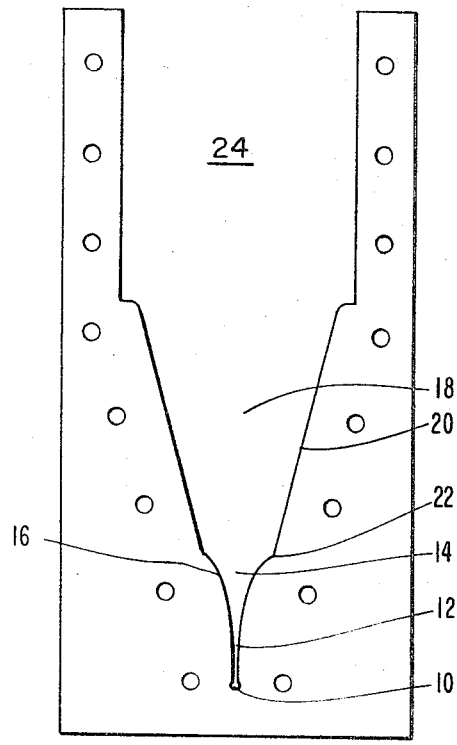
Figure 4:
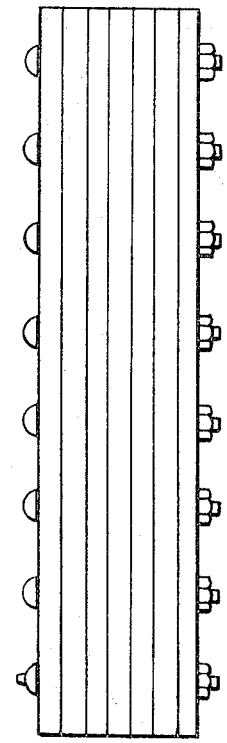
Figure 5:
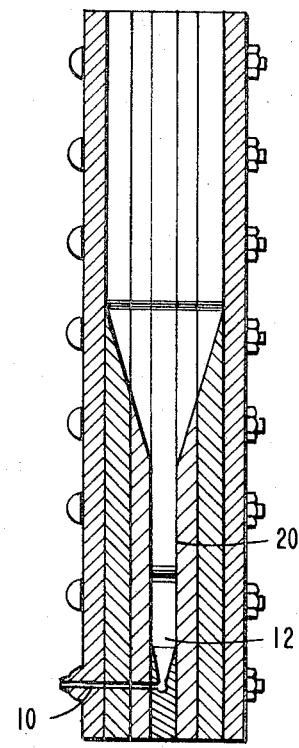
Figure 1:
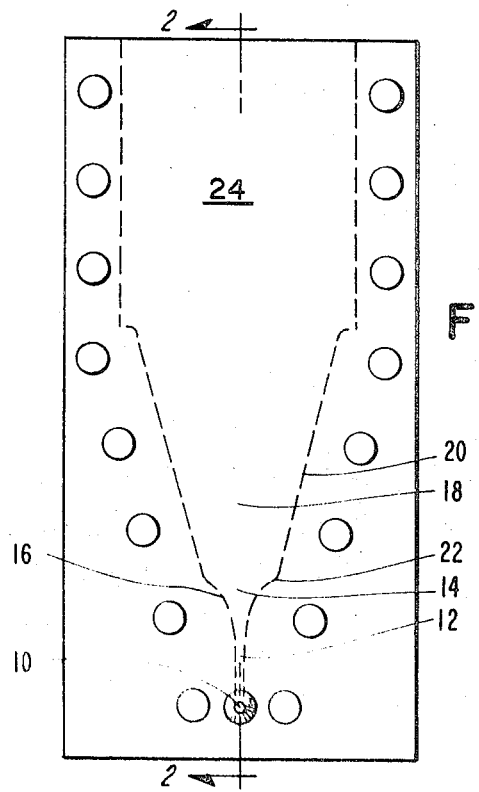
Figure 2:
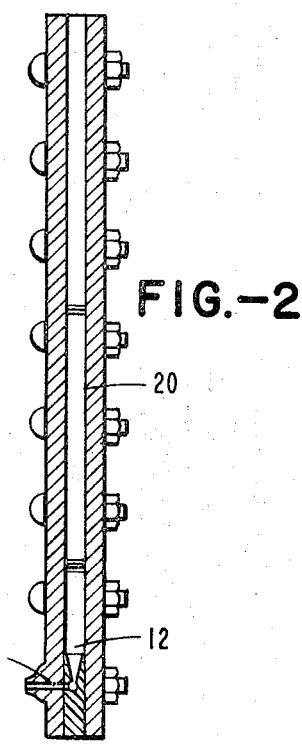

Turning to the drawings,

FIG. 1 shows a front plan view of one embodiment of the layering device of this invention, FIG. 2 is a sectional view taken along the line 2—2 in FIG. 1, FIG. 3 is a front plan view of another embodiment of the present invention, FIG. 4 is a side plan view of the device of FIG. 3, and FIG. 5 is a sectional view of the device of FIG. 3.

Four variables are involved in the configuration of the cone: (a) the velocity of the incoming liquid, (b) the distance from the inlet to the bottom of the expansion area, (c) the size of the expansion area, and (d) the angle formed by the sides of the cone, or side of the cone if of circular cross-section. In order to layer, the incoming liquid must have a density equal to or greater than the liquid already in the cone, and for the least mixing of layers the flow rate should remain constant.

Two variations of the above theoretical system have been used in practice and both produce continuous density gradients from two original solutions which differ by no more than 0.03 grams per milliliter. In one, a gradient of 122 ml. volume with a height of 80 mm. clearly shows that layers 1 mm. apart are different so that the density differences between layers must be extremely small.

The first variation is shown in FIGS. 1 and 2. The clear plastic for the two sides and the center piece shaping the cone are ¼-inch thick. The cone is bolted together with stainless steel bolts using wingnuts so that it may be easily disassembled. This drawing also shows a place above the cone into which the gradient is raised after formation by introducing a heavy sugar solution through the inlet. For this particular use the gradient was forced between two square thin glass plates which are placed in the area at the top. For this cone the flow rate used is 3 to 4 milliliters per minute.

The second variation is shown in FIGS. 3–5. It also is made of pieces of clear plastic and is used as the previous case. However, the expansion area is a little larger, ⅜-inch wide instead of ¼ inch. Furthermore, above the expansion area this cone widens in two dimensions instead of one as in the first variation. The flow rate for this cone is between 9 and 12 milliliters per minute.

A third variation is also possible and may be of more universal use in which the cone would be of circular cross-section. In that case the cone would be elongated so that the expansion area would have a smaller diameter than the width shown in the first variation. Thus, at the tangential connection of the curved part of the expansion area with the straight sides the cross-sectional area would be the same as in the first variation.

A fourth variation has also been constructed in which no bolts are used, all plastic pieces are fused together to make a single non-separable unit. The advantage of the single unit is that the possibility of bubbles formed by escape of air from between the plates is prevented. A rising air bubble can destroy a density gradient.

Turning to the drawings in greater detail, the constricted inlet passage 10 communicates with the constricted riser 12. The expansion area 14 above riser 12 has at least some interior surfaces 16 which are concave. Above expansion area 14 is the enlarged zone 18 having at least some interior planar surfaces 20, some of said surfaces 20 being vertical and some forming an acute angle with respect to the horizontal, the transition 22 from surfaces 16 to surfaces 20 being free of disruptions or protuberances capable of producing turbulence. Positioned above zone 18 is a zone 24 having essentially vertical planar inside surfaces.

In general, the cross-sectional area of zone 18 at its top or upper end is at least 2 or 3 times greater than its cross-sectional area at its bottom or lower end in proximity to transition 22.

Having fully described the invention, it is intended that it be limited only by the lawful scope of the appended claims.

I claim:

1. A layering cone device adapted to rapidly layer heavier liquids below lighter ones with a horizontal interface between layers which comprises:
   a. a constricted inlet passage adapted to produce turbulent flow which communicates at an angle with,
   b. a constricted riser adapted to contain turbulent flow,
   c. communicating with and above said riser an expansion area characterized by interior surfaces which are of a concave curvature to quickly dissapate the turbulent flow and initiate non-turbulent flow while preventing faster or slower flow along said interior surfaces, and
   d. above said expansion area an enlarged zone characterized by interior planar surfaces to further spread out the liquid while maintaining a horizontal interface between layers of the liquid.

2. The device of claim 1 wherein said inlet passage communicates at a right angle with said constricted riser.

3. The device of claim 1 wherein said inlet passage communicates at a right angle with said constricted riser and said riser is vertical.

4. The device of claim 1 wherein said enlarged zone is of rectangular cross section and expands in both dimensions.

5. The device of claim 1 wherein said device is made of transparent plastic and is adapted to be disassembled into a plurality of longitudinal segments.

6. The device of claim 1 wherein there is provided above said enlarged zone, a zone having essentially vertical inside surfaces and having a cross sectional area at least as large as said enlarged zone.

* * * * *